United States Patent [19]
Suzuki et al.

[11] Patent Number: 6,139,381
[45] Date of Patent: Oct. 31, 2000

[54] ENGINE AIR SUPPLY CONDUIT FOR WATERCRAFT

[75] Inventors: Akitaka Suzuki; Takaaki Madachi; Satoshi Koyano; Masaru Tamaki, all of Iwata, Japan

[73] Assignee: Yamaha Hatsudoki Kabushiki Kaisha, Japan

[21] Appl. No.: 09/345,449

[22] Filed: Jul. 1, 1999

[30] Foreign Application Priority Data

Jul. 30, 1998 [JP] Japan .................................. 10-216249

[51] Int. Cl.[7] .............................. B63H 21/00; B63C 7/00
[52] U.S. Cl. ........................................... 440/88; 114/55.51
[58] Field of Search .............................. 114/55.5, 55.51, 114/177, 179; 440/88, 89; 181/196, 214, 249, 250

[56] References Cited

U.S. PATENT DOCUMENTS

| | | | |
|---|---|---|---|
| 5,735,229 | 4/1998 | House et al. .............................. | 114/363 |
| 5,957,072 | 1/2000 | Hattori .................................. | 114/55.57 |
| 6,015,321 | 1/2000 | Ozawa et al. .............................. | 440/88 |
| 6,022,253 | 2/2000 | Ozawa et al. .............................. | 440/89 |

*Primary Examiner*—S. Joseph Morano
*Assistant Examiner*—Patrick Craig Muldoon
*Attorney, Agent, or Firm*—Bacon & Thomas PLLC

[57] ABSTRACT

An air supply conduit system for a watercraft having an air breathing internal combustion engine within the watercraft interior includes at least one air supply conduit extending from an outlet end located in the watercraft interior to an inlet end located outside the watercraft. A noise suppressing resonating chamber connected to the air supply conduit damps noise from the internal combustion engine from the outlet end of the conduit towards the inlet end thereof. The air supply conduit may be positioned within the watercraft to minimize entrapment of liquid within the conduit and the noise suppressing resonating chamber. An inlet fitting including a noise suppressor is located at the inlet end of the conduit.

18 Claims, 7 Drawing Sheets

ENGINE AIR SUPPLY CONDUIT FOR WATERCRAFT

BACKGROUND OF THE INVENTION

1. Field of the Invention

This invention relates to a sound suppression system for an engine air supply conduit for watercraft.

2. Related Art

This invention relates to an engine air supply duct for watercraft which provides a supply of air from outside the watercraft hull or enclosure to an internal combustion engine used for propulsion of the watercraft that is mounted inside a compartment within or defined by the watercraft hull.

This invention is particularly adapted for use with smaller watercraft that are intended to be operated by a driver that straddles a bench type seat extending along the upper longitudinal part of the watercraft and wherein an internal combustion engine is mounted inside the watercraft arranged to drive a jet pump mounted at the stern of the watercraft for propelling the craft in water. Such watercraft include an air supply system to supply air from outside the watercraft hull to the interior thereof for supply of combustion air to the internal combustion engine.

In accordance with prior art techniques, air intake noise in the air supply conduit and internal combustion engine noise generated inside the watercraft hull escaping through the air intake conduit detract from pleasurable operation of the watercraft.

The present invention is intended to attenuate air intake noise at the entrance to the air supply conduit as well as noise emanating from the conduit between the inside and outside of the watercraft hull.

An air supply system for watercraft includes an air supply conduit for introducing outside air to the inside of the watercraft hull that encloses an internal combustion engine for propelling the watercraft, wherein the air supply conduit includes a noise damping resonating chamber along its length. The air supply conduit also may include a noise suppressor at its inlet end in combination with the resonating chamber.

A plurality of air supply conduits including the aforesaid noise attenuating elements may be utilized. The air supply conduits are oriented and configured to enhance drainage of water from the conduits, including the resonating chambers, and may be branched to minimize taking on water through the conduits in the event that the watercraft capsizes and is righted by rotation about its longitudinal axis.

The inlet noise attenuator may be configured in the form of a flow divider network of smaller honeycomb-like cells for dividing the inlet into a plurality of small, short conduits that effectively attenuate noise emanating from the interior of the air supply conduit (and the interior of the watercraft hull) to ambient.

DETAILED DESCRIPTION OF PREFERRED EMBODIMENT OF THE INVENTION

Figure 1:
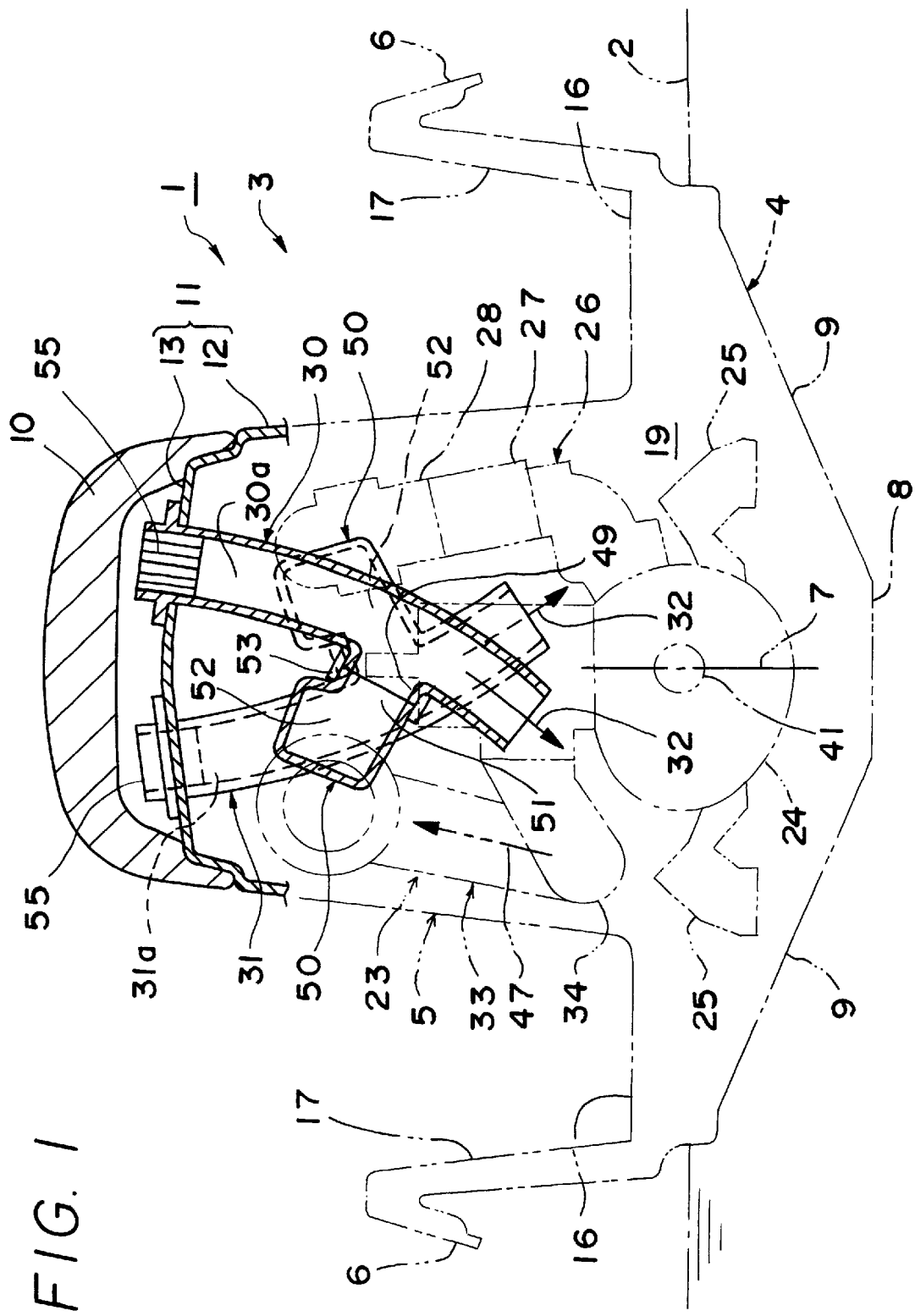
FIG. 1 is a schematic front elevation view of a watercraft incorporating the air supply system in accordance with the invention, showing air supply conduits with noise attenuating resonating chambers and inlet noise suppressors.
Figure 2:
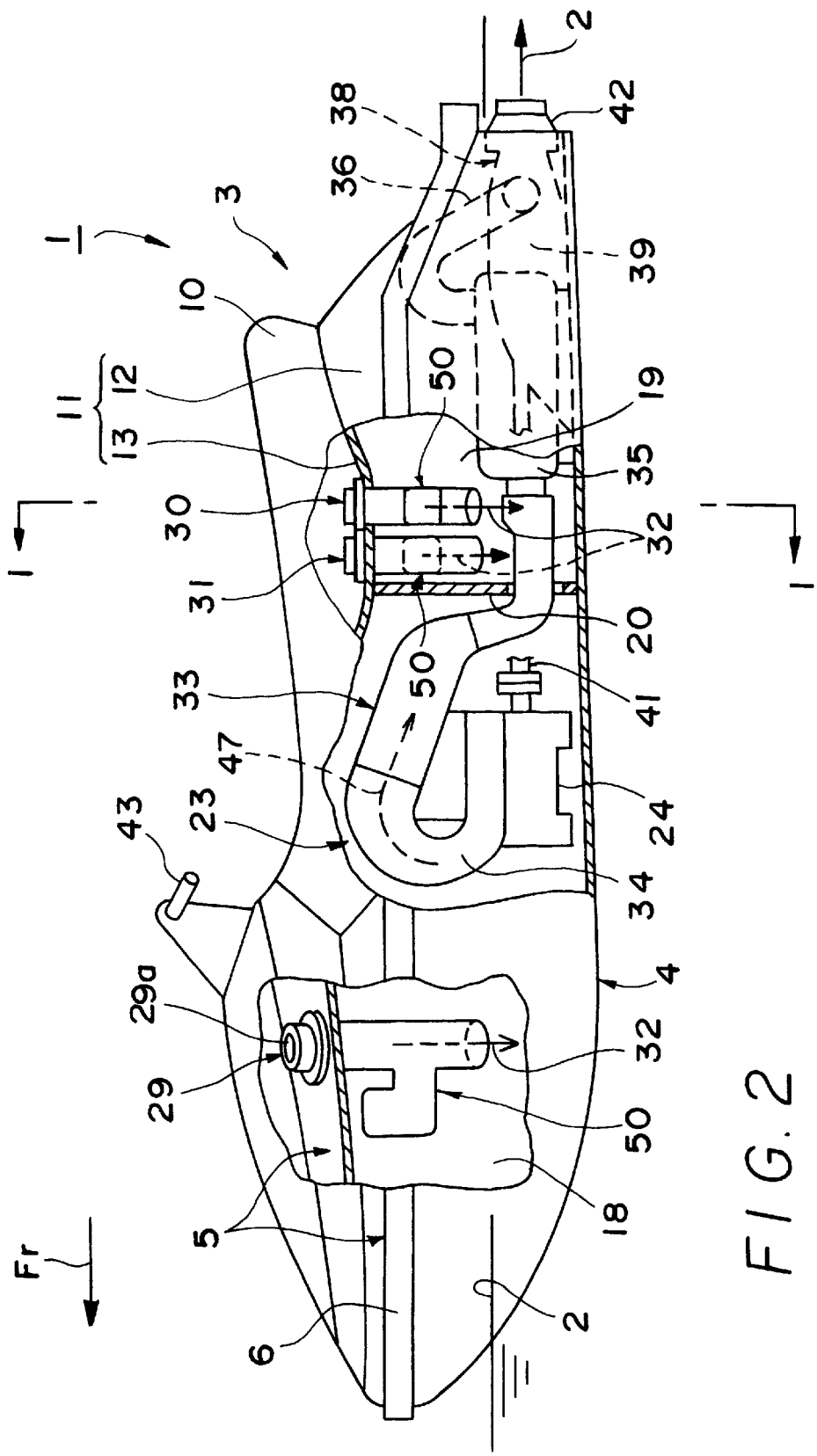
FIG. 2 is a side elevation, partial cutaway view of a watercraft showing the general arrangement of the air supply system.
Figure 3:
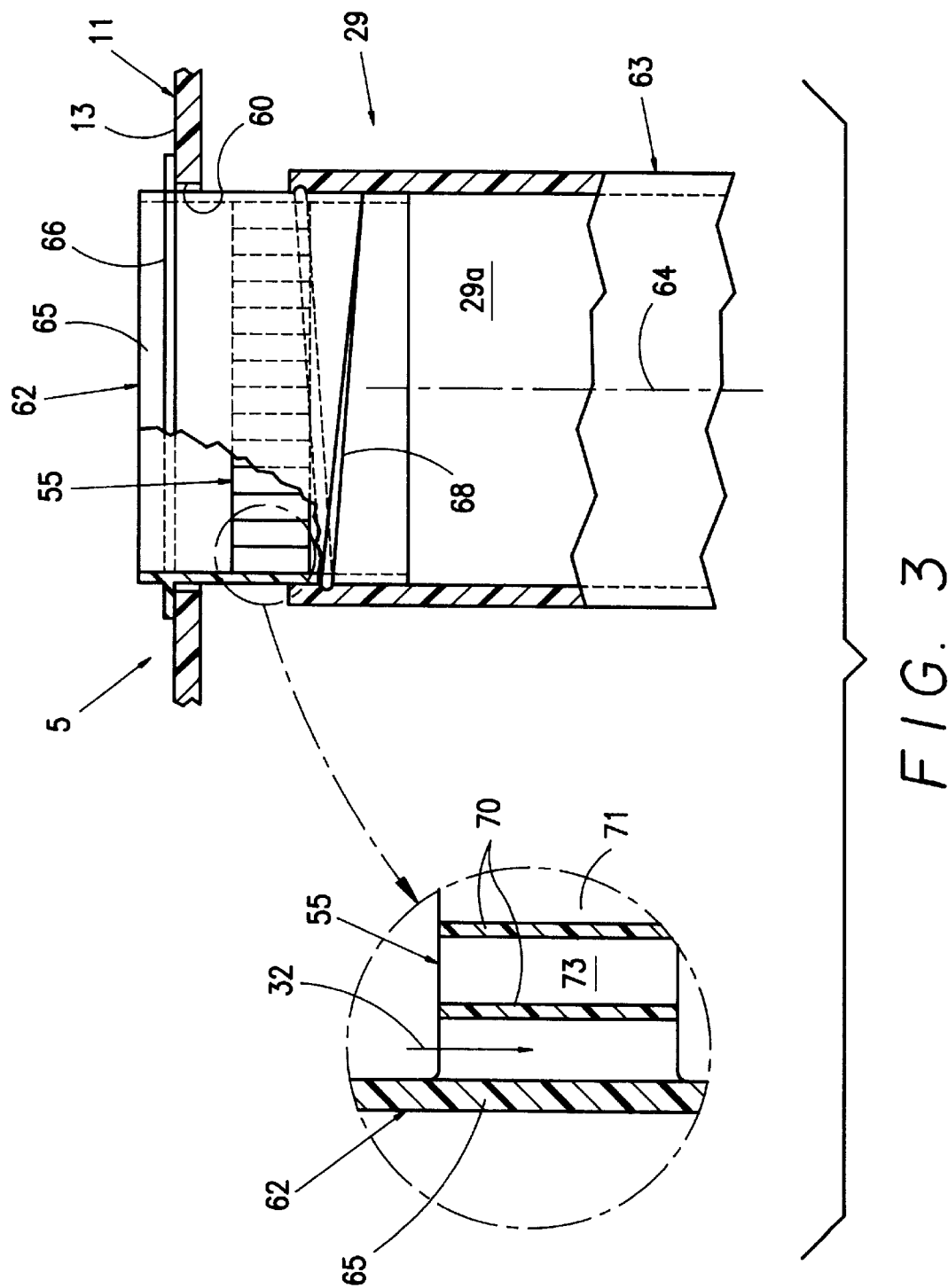
FIG. 3 shows one embodiment of the inlet area of an air supply conduit in accordance with this invention.

With reference to FIGS. 1 and 2, a small watercraft 1 having a straddle type seat (i.e., a saddle) 10 is shown floating on the surface 2 of a body of water. The arrow $F_R$ indicates the direction of forward movement of the watercraft. References to the left and right hereinafter will be made with reference to the transverse directions of the hull 3 of the watercraft when facing in the forward direction.

The watercraft is a planing type, that is, the craft is capable of planing over the surface of water at a constant, slightly elevated attitude while propelled at high speeds. The hull of the watercraft is made of fiberglass reinforced plastic (FRP) and comprises a lower hull 4 and a deck 5 which are vertically joined along a gunnel 6 formed at the junction between the lower hull and the deck around the perimeter of the watercraft.

The lower hull 4 includes an upwardly extending center portion 7 arranged and positioned so as to form a seat platform 11 upon which a saddle type seat 10 is removably mounted. The seat 10 and the platform 11 extend over a considerable length in the fore-aft direction of the watercraft and can accommodate a rider seated on the front part of the seat 10 facing forward and a forward-facing tandem rider seated behind the driver. This seat platform 11 includes a pair of left and right side panels 12, 12 that extend nearly perpendicular and a top plate 13 integrally formed at the top edges of the aforesaid left and right side panels 12, 12. The seat 10 is removably mounted along the top surface of the top panel 13.

Footrests 16 are formed on the left and right sides of the deck 5 and these footrests 16 extend integrally from the bottom end of the side panels 12 of the seat platform 11 to accommodate the feet of the watercraft riders.

Side panels 17 of the deck 5 are formed at the outer areas of the left and right footrests 16 and the side panels 9 of the lower hull 4 and the top edge of the deck 5 side panel 17 are joined together along a gunnel 6.

A bulkhead 20 divides the inside of the watercraft hull into a front compartment 18 that serves as an engine room and a rear compartment 19. The bulkhead is rigidly connected to both the lower hull and the deck and serves as a reinforcement member midway along the length of the watercraft to improve its strength and durability.

A passage is formed in the partition wall 20 that provides communication between the front and rear compartments 18, 19.

A propulsion unit is mounted in the watercraft hull 3 and is driven by an internal combustion engine 24 which is mounted in the forward compartment 18. The internal combustion engine typically is mounted centrally along the longitudinal center line of the watercraft and is connected to a bottom plate 8 of the lower hull 4 using resilient rubber mounts 25. An air induction system 26 is connected to the internal combustion engine 24. The air induction system 26 includes a carburetor 27 and a carburetor cover 28 and is arranged to supply combustion air to the internal combustion engine 24 from within the enclosure between the lower hull and deck of the watercraft.

An air supply conduit 29 extends from outside the interior of the watercraft to the interior thereof in the region of the forward compartment 18. In addition, a left-right pair of air supply conduits 30, 31 extend from outside the watercraft into the rear compartment 19. The respective air supply conduits may be composed of plastic conduits that extend generally vertically and, at their top ends, are fastened to the deck 5. The air supply conduits 29, 30 and 31 define air supply passages 29a, 30a and 31a, respectively.

An exhaust conduit extends from the exhaust manifold of the internal combustion engine 24. Connected in series with the exhaust 33 are a first exhaust conduit 34, a reverse flow check valve 35 and a second exhaust conduit 36, whereby the exhaust conduit 33 guides the exhaust gases from the internal combustion engine to outside the watercraft interior.

A jet pump 38 is mounted at the stern area of the watercraft, the pump including a water passage 39 opening at an area beneath the lower hull 4 and an impeller 40 (not shown) mounted inside the water passage, the impeller being driven by the internal combustion engine and connected thereto by a drive shaft 41.

A rudder nozzle 42 is mounted at the rear or stern end of the water passage 39 and this nozzle 42 is pivotally supported for actuation by a pair of handle bars 43 located in front of the seat 10 to enable steering of the watercraft.

Upon actuation of the internal combustion engine 24, induction of intake air draws air 32 from outside the interior of the watercraft hull through air supply passages 29a, 30a and 31a for induction into the internal combustion engine and combustion therein with fuel. In a known manner, exhaust gases 47 are produced which are discharged through exhaust pipe 33 to the outside of the watercraft.

Power from the internal combustion engine is transmitted to the impeller 40 of the jet pump by means of the drive shaft 41 which causes discharge of a jet of water rearwardly from the watercraft, resulting in propulsion of the watercraft in a forward direction as a result of the reaction of the surrounding water against the water jet. The watercraft operator may then steer the watercraft with the handlebars 43 to change the position of the nozzle 42 to thereby steer the watercraft in the desired direction.

Branch pipes 49 connected to sound attenuating resonator chambers 52 defined by resonator housings 50 are connected to the air supply conduits 29, 30 and 31 so that they are in communication with the air supply passages 29a, 30a and 31a. In accordance with the embodiment shown in FIG. 1, the branch conduits 49 are divided approximately mid-way and the resonance chambers 52 are removably attached to the conduits 29, 30 and 31.

As a result of utilizing the resonance chambers 52, the pulsating noise produced by the internal combustion engine within the watercraft is attenuated in the resonance in accordance with known principles of noise cancellation chambers before it reaches each inlet of the air supply conduit. This reduces the noise outside the watercraft and improves the comfort of the watercraft riders.

In addition, noise attenuating elements 55 comprising stream dividers dividing the incoming air stream by means of smaller cross-section passages are provided at the inlet end of each air supply conduit. For example, the inlet noise attenuators may be constructed in the form of porous, honeycomb structures. By providing such noise attenuating elements at the intake of each air supply conduit, noise generated by air passing through the inlet of the air conduit and within the conduit is attenuated at the inlet end of the conduit in accordance with known principles of acoustics.

Either or both of the air supply conduits 30, 31 may slope toward the left or right of the watercraft at it extends downwardly into the interior of the watercraft so that each conduit extends across the longitudinal center line 7 of the watercraft.

As a result of this configuration, in the event that the watercraft capsizes, upon righting of the watercraft by turning it around a central longitudinal axis, water is prevented from flowing into the top end of one or the other air supply conduits (or the bottom end when overturned) and passing through the air supply conduits 30a, 31a to the inside of the watercraft.

When the watercraft is in its normal position, the bottom surfaces of the resonating chambers 52 tilt downwardly toward the side of the air supply conduits 29a, 30a, 31b so that, if water is retained inside the resonating chamber or the branch conduit 51, it will drain out quickly to prevent long term retention of moisture.

Moreover, the air supply conduits are arranged to slope downwardly with the resonating chambers 50, 52 positioned in the surplus space above the conduits to make efficient use of the space and to maintain a compact configuration of the air supply system.

The lower ends of the branch conduits 49 are positioned above the water line when a rider is seated on the watercraft.

While not shown, flotation material may be installed inside the watercraft to maintain the interior of the watercraft above the water line even with the interior flooded.

While a plurality of air supply conduits 29, 30 and 31 are illustrated in the embodiment described above, it is also possible just to use a single air supply conduit 29 or only air supply conduits 30, 31. Moreover, the forward air supply conduit 29 may be provided with left and right pair of air supply conduits 30, 31. It is also possible to form the conduits 29, 30, 31 from flexible, elastomer conduit materials. Use of such sound dampening materials further attenuates the noise emanating from the interior of the water craft and passing through the air supply passages 29a, 30a and 31a.

If desired, the air supply conduits 29, 30 and 31 may be formed integrally as one piece with the resonating chamber housing 50, thereby obviating the need for the clamp or band 53.

It is also possible to locate the resonating enclosures defining the resonating chambers 52 at different circumferential locations around the air supply conduits 29, 30 and 31 so that, with the watercraft propelled forwardly with the bow of the watercraft raised, water entering the enclosures 50 will pass through the branch pipe and be expelled through the air supply conduits 29, 30 and 31 to thereby assure water drainage from the resonating chambers 52.

In accordance with another embodiment of the invention, and with reference to FIGS. 3 through 7, wherein elements corresponding to similar elements in FIGS. 1 and 2 are provided with the same reference numerals, a top panel 13 of deck 5 is provided with an aperture 60 for supporting air supply conduit 29. An inlet fitting 62 is provided at the inlet end of the air supply conduit 29, the other end of the conduit 29 extending downwardly within the watercraft. The inlet fitting 65 includes a flange 66 extending laterally from the central portion of its circumferential surface, the flange engaging the top surface of the top panel 13 around the opening of the aperture 60. Fastener 67, for example screws or the like, removably attach the fitting to the top panel 33 to thereby support the inlet fitting on the deck top panel. A protrusion or ridge 68 is provided to frictionally secure a conduit at the lower end of the inlet fitting 62.

The air supply conduit 63 in accordance with this embodiment is made of plastic and is formed as a bellows-like corrugated tube. The cross-section of the conduit is circular and the top end is connected by the protrusion 68 to the inlet fitting 62, with or without a clamping band or the like. Thus, the upper end of the air supply conduit 63 is supported at the top panel 13 by the inlet fitting 62. The opposite or lower end of the air supply conduit may be left unsupported.

Figure 4:
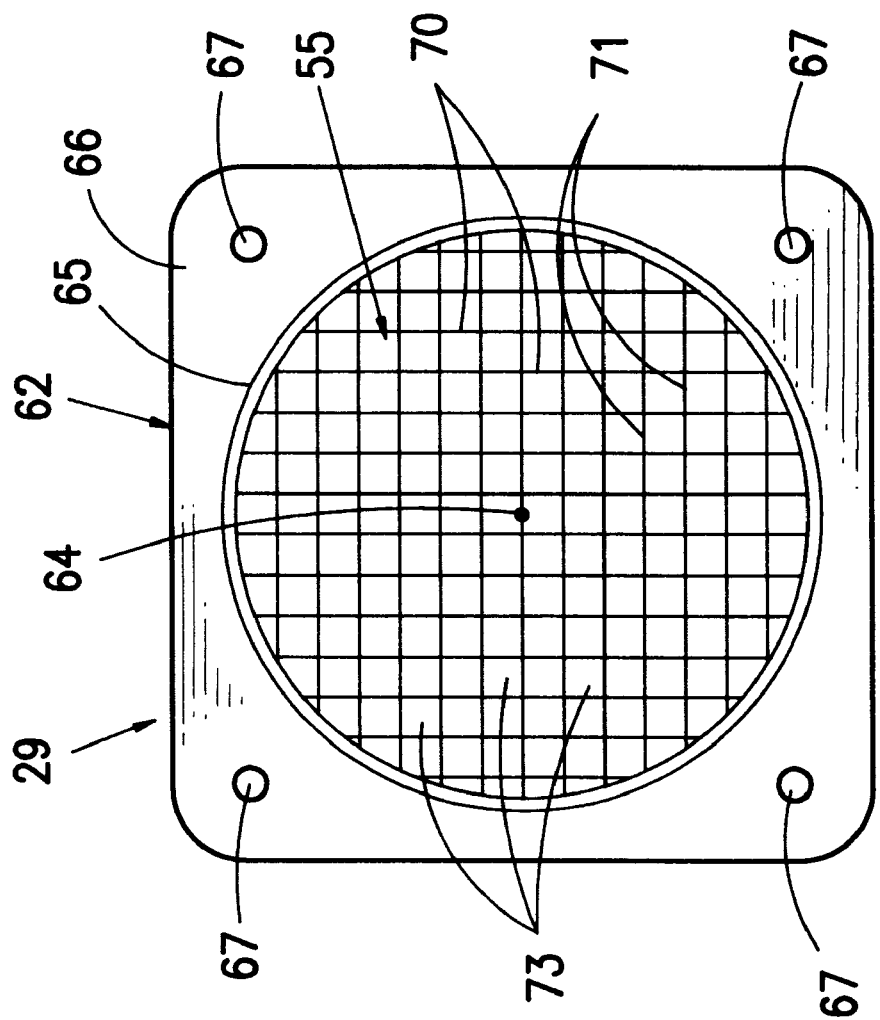
FIG. 4 is a top plan view of an air inlet member shown in FIG. 3.

Within the inlet fitting 62 there is provided a noise attenuation flow dividing element 55 that may be integrally formed as one piece with the inlet fitting 65. This flow divider element 55 includes a plurality of partitioning or separation walls 70 which define a plurality of parallel smaller conduits or channels that effectively divide the passing air supply stream into smaller streams. The smaller conduits are divided by axially extending walls 70 that extend generally parallel to the axial direction of the air supply conduit or the inlet fitting 62. The walls 70 may be made of plastic and are spaced generally equidistant across the flow passage defined the inlet fitting 62. Other walls 71 also extend horizontally and vertically so as to intersect with the walls 70 along the axis 64 of the inlet fitting 62. These walls 71 also may be made of plastic, are flat and may be positioned parallel to each other with equidistant intervals between them. The walls 70, 71 may be integrally formed as one piece with the inlet fitting 62 and define a disk shaped overall group of passages, as shown in FIG. 4. The passages may form a checkerboard-like pattern of openings that extend linearly along the axis 64 of the air supply passage 73.

Due to the integral structure of the inlet structure 62, vibrations from the watercraft running through the water do not affect the position of the noise attenuating passages defined by the walls 70, 71 so that their location remains at an optimal position.

It will be noted that the noise attenuating member 55 is positioned in close proximity to but below the top edge of the inlet fitting 62 whereby the space inside the inlet fitting 62 can remain open directly above the top panel 13 of the deck 5. In the event that some foreign material is drawn into the inlet fitting with the air, it can be easily removed from the top surface of the noise attenuation grid defined by the walls 70, 71. Also, the top surface of the grid remains recessed below the top edge of the inlet fitting 62 to avoid unintentional impact with the noise attenuator during maintenance procedures. This prevents the walls 70, 71 from being damaged during such maintenance or other activities that could otherwise damage the walls.

Figure 5:
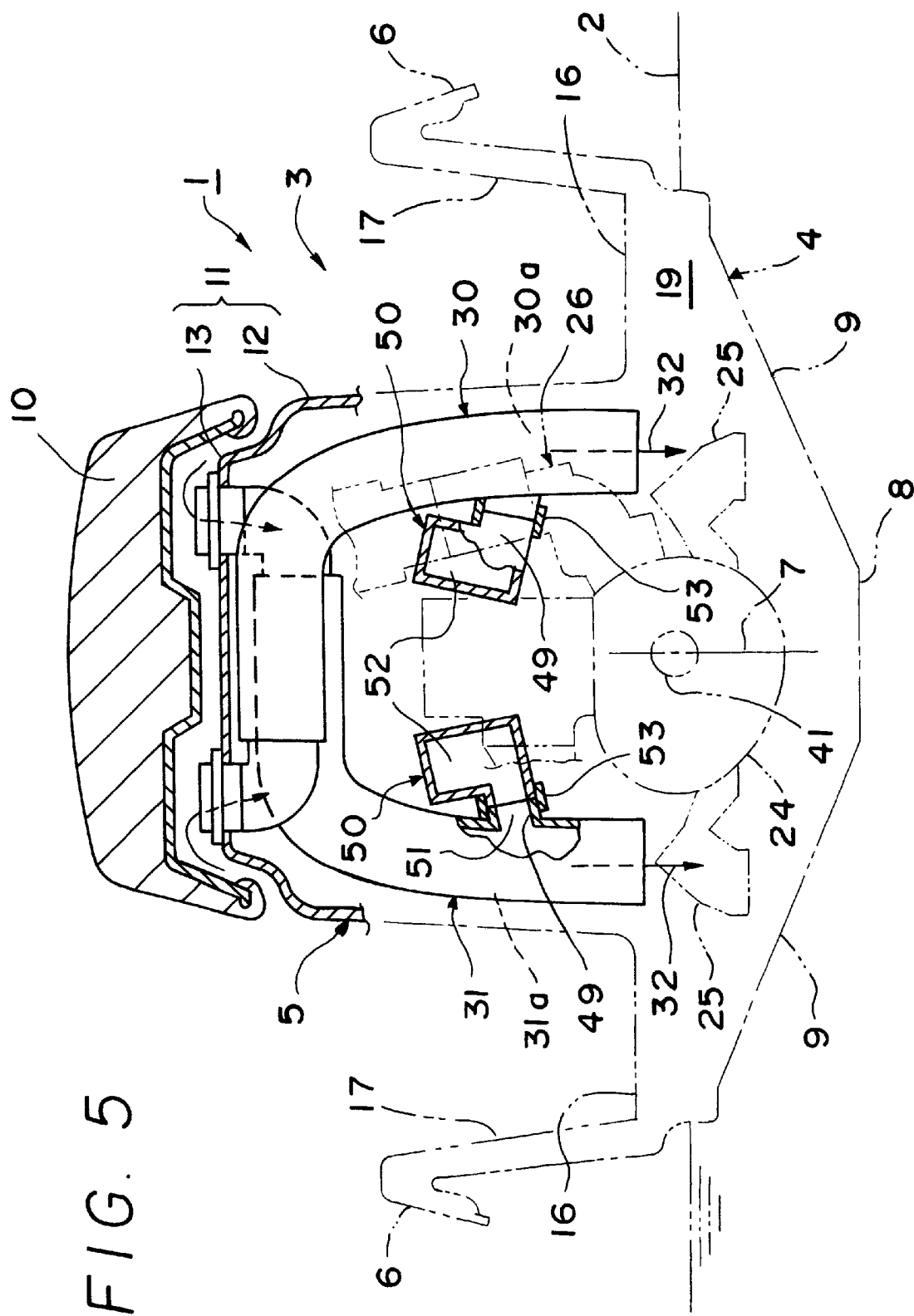
FIG. 5 shows another embodiment of the invention wherein the air supply conduits are provided with a different shape.
Figure 6:
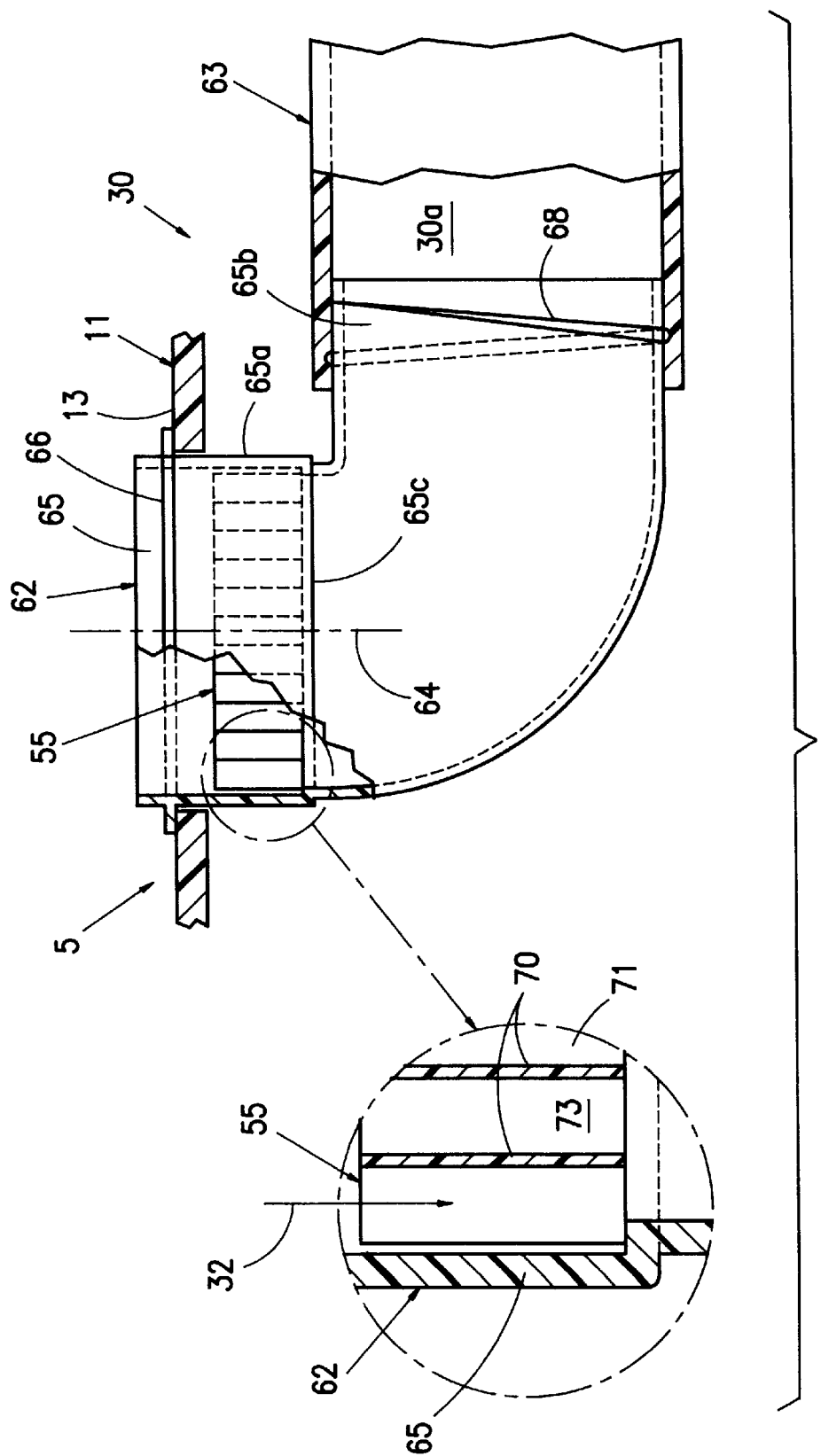
FIG. 6 shows a detail of the embodiment of the invention shown in FIG. 5.
Figure 7:
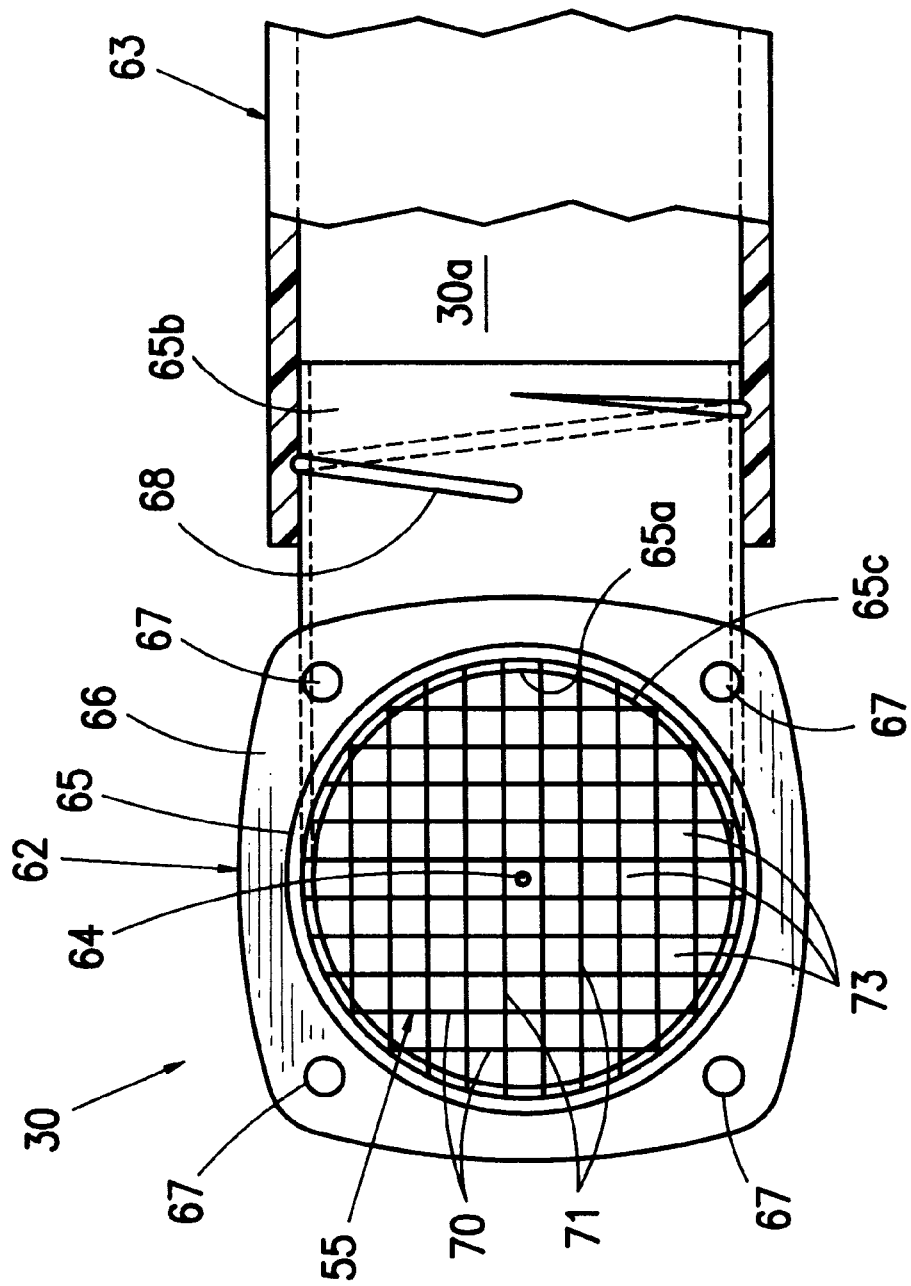
FIG. 7 is a top plan view of the inlet to the air supply conduit shown in FIG. 6.

Another embodiment of the invention is shown in FIGS. 5 through 7 where air supply conduits 30, 31 include inlet fittings 65 that are generally L-shaped, including a vertical leg 65a extending downwardly and a generally horizontal leg 65b that extends approximately horizontally.

The noise attenuator may be attached midway in the vertical leg 65a, that is, approximately at its halfway point. More specifically, the top end of the vertical leg 65a is of larger diameter an the bottom end is of smaller diameter, thereby forming a ledge 65c between the two legs. The noise attenuator 55 is a separate member from the inlet fitting 62 and is removably press-fitted into the top of the vertical leg 65a. When so installed, the bottom edge surface of the noise attenuator 55 makes contact with the top surface of the ledge 65c, thereby accurately locating the noise attenuator 55 inside the air supply conduit 30. Moreover, the press-fit relationship of the noise attenuator 55 in the air supply conduit frictionally maintains the noise attenuator in position as a result of high friction loads and the resilient force between the members. On the other hand, the press-fit also enables ready replacement of the noise attenuator member in the air supply conduit and also facilitates it attachment in the vertical leg 65a. Accordingly, different noise attenuator members may be provided to enable tuning of the attenuator to the noise characteristics to be attenuated at the inlet of the air supply conduit.

It will thus be seen that the air supply system in accordance with the invention attenuates noise generated by air flowing through the air supply conduits as well as noise generated within the watercraft and transmitted along the air supply conduits towards their inlet ends.

It will be understood that various modifications may be made to the embodiments described herein without departing from the spirit and scope of the invention as defined in the claims that follow.

What is claimed is:

1. An air supply system for a watercraft having an enclosed compartment for an air breathing internal combustion engine within the watercraft interior, comprising:

at least one air supply conduit defining an air supply passage extending from an outlet end located in the watercraft interior and in communication with said compartment to an inlet end located outside the watercraft;

a branch conduit connected to the air supply conduit at a location within the watercraft interior and extending away from the air supply conduit;

an enclosure defining a noise suppressing resonating chamber connected to the branch conduit with the resonating chamber in open communication with the air supply passage; and a noise suppressor located at the inlet end of the air supply conduit.

2. An air supply system for a watercraft having an enclosed compartment for an air breathing internal combustion engine within the watercraft interior, comprising:

at least one air supply conduit defining an air supply passage extending from an outlet end located in the watercraft interior and in communication with said compartment to an inlet end located outside the watercraft;

a branch conduit extending from and connected to the air supply conduit at a location within the watercraft interior at approximately a middle region between the inlet end and outer end of said conduit, and extending away from the air supply conduit;

an enclosure defining a noise suppressing resonating chamber connected to the branch conduit with the resonating chamber in open communication with the air supply passage.

3. An air supply system as claimed in claim 2, including a noise suppressor located at the inlet end of the air supply conduit.

4. An air supply system as claimed in claim 3 or 2, wherein said watercraft includes a lower hull and a deck thereon that together form a watertight enclosure within the watercraft interior, the deck includes an elevated section and a straddle type seat located on the elevated section, and further wherein said inlet of said air supply conduit is located at the level of said deck adjacent said seat.

5. An air supply system as claimed in claim 2, 3 or 1 wherein said air supply conduit between its inlet and outlet ends extends on opposite sides of a longitudinal center line of the water craft.

6. An air supply system as claimed in claim 3 or 1, wherein said noise suppressor comprises a stream flow divider dividing the inlet area of the air supply conduit into smaller, noise attenuating passages.

7. An air supply system as claimed in claim 6, wherein said noise suppressor comprises an inlet fitting removably connected to the air supply conduit.

8. An air supply system as claimed in claim 7, wherein said watercraft includes an upper deck and said fitting includes a deck engaging flange area configured to be secured to the upper deck.

9. An air supply system as claimed in claim 8, wherein said stream flow divider is integrally formed in one piece with said inlet fitting.

10. An air supply system as claimed in claim 7, wherein said inlet fitting includes an upper terminal end and said stream flow divider is located below said terminal end.

11. An air supply system as claimed in claim 10, wherein said stream flow divider is integrally formed in one piece with said inlet fitting.

12. An air supply system as claimed in claim 7, wherein said inlet fitting is configured as a tubular inlet conduit.

13. An air supply system as claimed in claim 12, wherein said inlet conduit includes an elbow section.

14. An air supply system as claimed in claim 13, wherein one leg of said elbow section extends upwardly and said stream flow divider is located in said upwardly extending leg.

15. An air supply system as claimed in claim 14 wherein said stream flow divider is a unitary assembly disposed in pressed-fit relationship in said upwardly extending leg so that it is frictionally retained in said inlet fitting.

16. An air supply system as claimed in claim 2, including a second air supply conduit, said second air supply conduit defining a second air supply passage extending from a second outlet end located within the watercraft interior to a second inlet end located outside the watercraft;

a second branch conduit extending from and connected to said second air supply conduit at a location within the watercraft interior and extending away from the second air supply conduit;

a second enclosure defining a second noise suppressing resonating chamber connected to the second branch conduit at a location between the inlet end and the outlet end of said second branch conduit, and with the second resonating chamber in open communication with the second air supply passage;

said first and second air supply conduits between their respective inlet and outlet ends each extending on opposite sides of a longitudinal center line of the watercraft, with the respective outlet ends of said first and second air supply conduits disposed on opposite sides of said center line.

17. An inlet fitting for an air supply conduit for constituting an air delivery device for an engine located within the interior of a watercraft, comprising:

an elbow shaped tubular conduit section including orthogonal first and second leg portions;

a conduit engaging protrusion feature on one leg;

an internal shoulder located within the other leg;

a noise suppression stream flow divider assembly located in said other leg and seated on said shoulder;

flange elements connected to said other leg and extending radially outwardly to enable the fitting to be secured to a surface adjacent the fitting.

18. An inlet fitting for an air supply conduit constituting an air delivery device for an engine located within the interior of a watercraft, comprising:

a tubular conduit section having opposed inlet and outlet ends;

a conduit engaging and retaining element located on the outlet end of the conduit section;

a flange element connected to said inlet end and extending radially outwardly to enable the fitting to be secured to a surface adjacent the fitting;

a noise suppressing stream flow divider located in the inlet end of the tubular conduit section, said stream flow divider constructed integrally in one piece with said inlet fitting;

said inlet end including a terminal end and said stream flow divider located inwardly of said terminal end so as to leave a portion of said inlet end open above the stream flow divider.

* * * * *